(12) United States Patent  (10) Patent No.: US 8,146,920 B2
Hacker  (45) Date of Patent: Apr. 3, 2012

(54) TILE GAME APPARATUS AND METHOD FOR LEARNING ALPHABET-BASED SYMBOLIC NOTATION

(76) Inventor: Leonard Hacker, Washington, DC (US)

( * ) Notice: Subject to any disclaimer, the term of this patent is extended or adjusted under 35 U.S.C. 154(b) by 617 days.

(21) Appl. No.: 11/946,616

(22) Filed: Nov. 28, 2007

(65) Prior Publication Data

US 2009/0134576 A1    May 28, 2009

(51) Int. Cl.
*A63F 3/00*    (2006.01)

(52) U.S. Cl. .......................... 273/272; 273/299; 434/172

(58) Field of Classification Search .................. 273/292, 273/296, 272, 299; 434/159, 172
See application file for complete search history.

(56) References Cited

U.S. PATENT DOCUMENTS

| | | | | |
|---|---|---|---|---|
| 1,264,508 A | * | 4/1918 | Heartt et al. | 273/296 |
| 1,342,520 A | * | 6/1920 | Wright | 273/296 |
| 1,428,456 A | * | 9/1922 | Stranders | 434/170 |
| 2,154,891 A | * | 4/1939 | Dodge | 273/296 |
| 2,505,230 A | * | 4/1950 | Composto | 434/343 |
| 2,581,595 A | * | 1/1952 | Mioduski et al. | 434/170 |
| 3,210,865 A | * | 10/1965 | Muntz | 434/172 |
| 3,326,557 A | * | 6/1967 | Berendt | 273/272 |
| 3,769,721 A | * | 11/1973 | Reiner | 434/345 |
| 4,158,921 A | * | 6/1979 | Stolpen | 434/403 |
| 4,402,513 A | * | 9/1983 | Head | 273/296 |
| 4,846,687 A | * | 7/1989 | White et al. | 434/112 |
| 5,306,153 A | * | 4/1994 | Foster | 434/170 |
| 5,441,278 A | * | 8/1995 | Nalder | 273/272 |
| 5,803,742 A | * | 9/1998 | Buti | 434/157 |
| 6,099,318 A | * | 8/2000 | McLeod et al. | 434/129 |
| 6,271,453 B1 | * | 8/2001 | Hacker | 84/476 |
| 6,422,562 B1 | * | 7/2002 | Daniel | 273/272 |
| 6,575,468 B1 | * | 6/2003 | Hall | 273/298 |
| 6,986,513 B1 | * | 1/2006 | Ferrante | 273/272 |
| 7,011,525 B2 | * | 3/2006 | Mejia | 434/167 |
| 7,494,127 B2 | * | 2/2009 | Schmidt | 273/299 |
| 7,604,236 B2 | * | 10/2009 | Lou-Hsiao | 273/269 |

* cited by examiner

*Primary Examiner* — William Pierce
(74) *Attorney, Agent, or Firm* — The Marbury Law Group, PLLC

(57) ABSTRACT

A tile-based game is used for teaching symbolic notation corresponding to alphabetical notation, such as found in music and code or sign language, by having players attempt to spell word with the symbolic notations that appear on one side of the tiles. Players are given points for the correct assembly or deciphering of a word with the tiles and check for correct answers by viewing the corresponding alphabetical notations on an opposite side of the tiles. The game can be implemented virtually on a computer.

8 Claims, 3 Drawing Sheets

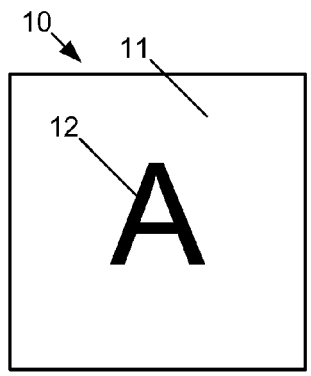
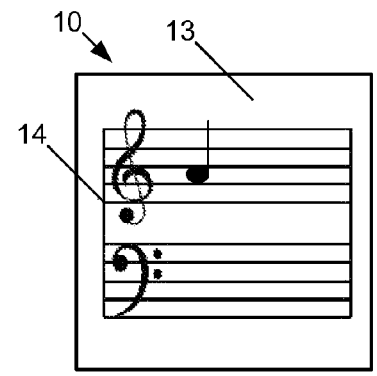
FIG. 1A  FIG. 1B
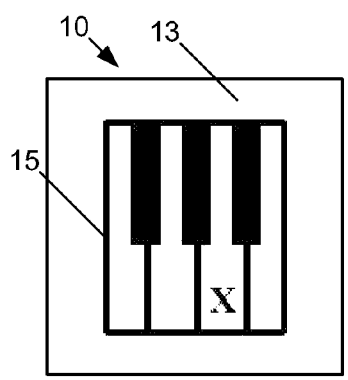
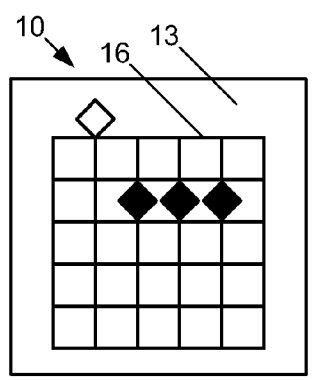
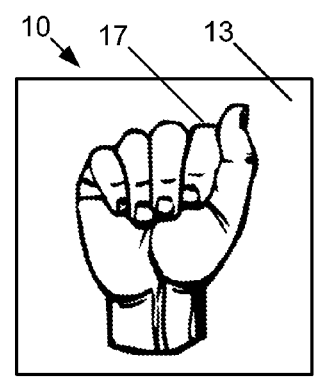
FIG. 1C  FIG. 1D  FIG. 1E
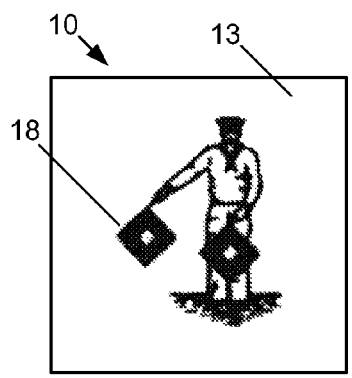
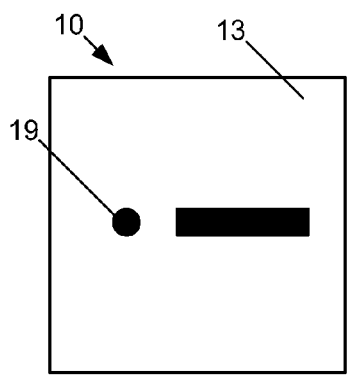
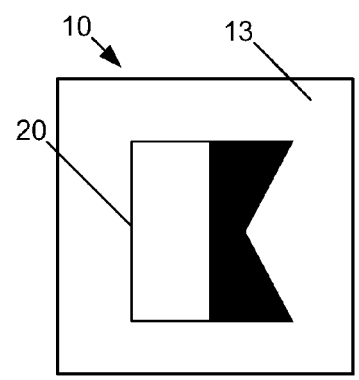
FIG. 1F  FIG. 1G  FIG. 1H

TILE GAME APPARATUS AND METHOD FOR LEARNING ALPHABET-BASED SYMBOLIC NOTATION

BACKGROUND

One of the first forms of notation learned by children is the alphabet. However, other forms of notation that are based upon the alphabet, such as Morse code, semaphore, American Sign Language (ASL), and music notation, whether on a staff or instrument, are usually learned later in life and can be cumbersome and difficult to learn. Simple memorization and flash cards have been used for learning such forms of symbolic notation, but these methods essentially rely upon simple conditioning (i.e., behaviorism learning theory) that more modern learning theories have found less suitable for learning language-type material.

Constructivism learning theory views learning as a process in which the learner actively constructs or builds new ideas or concepts based upon current and past knowledge. In other words, "learning involves constructing one's own knowledge from one's own experiences." What would be useful is a new way of learning alphabet-based symbolic notation that is challenging, fun, and uses more suitable learning theories based upon constructivism.

BRIEF SUMMARY

Various embodiments are drawn to a learning game and more particularly to a tile-based game for learning various forms of alphabet-based symbolic notation. The game involves using a player's prior knowledge and experience with words to help place the symbolic notation in a known context to improve learning and retention.

In one embodiment, a game apparatus includes a plurality of tiles that have an alphabetical notation on one side and the symbolic notation to be learned (i.e., symbol) on the other. A tile holder is used to arrange the tiles to form a word based upon the symbols and points are awarded and recorded either electronically, mechanically, or on a score pad.

In another embodiment, a method comprises distributing tiles that have an alphabetical notation on one side and the symbolic notation to be learned (i.e., symbol) on the other to a plurality of players. Tile may be held in a tile holder for ease of manipulation. In turn, each player forms words based upon the symbols. Points are awarded for correctly-spelled words based upon the length of the word. Each players' points are tallied until a player accumulates a predetermined number of points required to win the game.

In further embodiments, game play is accomplished via a computer and can optionally take a quiz form where one player spells a word that is displayed as symbols to the other player, who then gets points for deciphering the symbols and spelling the word. Other computer-based embodiments can use sound and/or can be adapted for use by players with various impairments.

BRIEF DESCRIPTION OF THE DRAWINGS

FIG. 1A illustrates an alphabet side of a game tile;

FIGS. 1B-H illustrate various embodiments of the symbol side of the letter "A" game tile of FIG. 1A;

DETAILED DESCRIPTION

Figure 2:
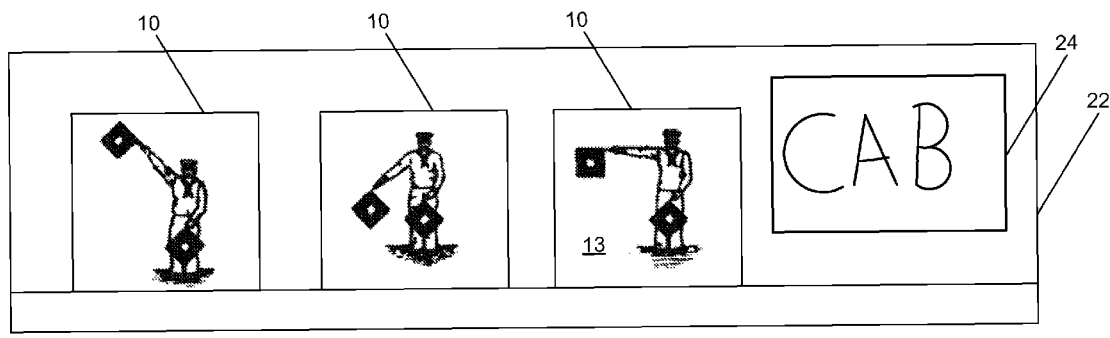
FIG. 2 illustrates a tile holder with tiles spelling the word "CAB" with semaphore notation symbols.

Embodiments of the invention are related to a tile-based game that is used for teaching symbolic notation corresponding to alphabetical notation, such as found in music and code or sign language, by having players attempt to spell word with the symbolic notations that appear on one side of the tiles. Players are given points for the correct assembly of word with the tiles and check for correct answers by viewing the corresponding alphabetical notations on an opposite side of the tiles. Constructivism learning theory is employed by having player associate the symbolic notation being learned with the player's preexisting knowledge of words.

A basic component of the disclosed game and method is the game tile. Such tiles can be made of any suitable material, including, but not limited to, wood, plastic, cardboard, and ceramic. Each game includes a set of tiles corresponding to the set of symbolic notation being learned and can include multiple copies of the same tile for purposes of game play, if desired.

In addition to physical tiles, the game can also be played using virtual tiles in a software-enabled version of the tile game that is played via computer, as is well within the skill of computer programming.

As illustrated in FIG. 1A, each game tile 10 includes a side 11 with an alphabetic notation 12, such as the illustrated letter "A". The opposite side 13 of tile 10 has a corresponding symbolic notation that the players are learning, such as illustrated in FIGS. 1B-1H. In FIG. 1B, a music note "A" as it appears on a music staff 14 is illustrated as the symbol corresponding to the letter "A". In FIG. 1C, a music note "A" as it appears on a piano or keyboard 15 is illustrated as the symbol corresponding to the letter "A". In FIG. 1D, a music chord "A" as it appears for fingering on a guitar 16 is illustrated as the symbol corresponding to the letter "A".

Since the musical scale, as used in the exemplary embodiments of FIGS. 1B-1D, are limited to the letters A, B, C, D, E, F, and G, these are the only letters for which tiles will be made, although embodiments could also possibly include majors and minors for chords or sharps and flats for notes. Similarly, for musical instruments that have various methods for producing the same notes or chords (see, e.g., a guitar chord book), multiple variations of the same note or chord can be used in the tile set. For purposes of game play, plural copies of each tile can be used in a tile set.

While a piano-type keyboard and a guitar fretboard have been illustrated as examples, embodiments can be adapted for virtually any musical instrument that involves fingering or playing of keys, strings, holes, valves, slides, bars, bells, chimes, drum heads, etc. which can be rendered symbolically. As such, further embodiments for instruments in the string, brass, woodwind, percussion, and electronic families are anticipated by the present inventor.

As an additional learning tool, embodiments using musical notes or chords can optionally use color with the tiles, where a letter 10 and its corresponding symbolic notation, or the faces 11, 13 of tile itself, can have the same color to assist players in learning the symbols based upon color associations. This is particularly useful for young students who are already learning an instrument based on the same color associations. For example, while FIG. 1C has indicated the note A with an "x," the key could also be indicated by coloring the key, and perhaps even exaggerating its size.

In FIG. 1E, the ASL symbol for "A" as modeled by a hand 17 is illustrated as the symbol corresponding to the letter "A". In FIG. 1F, a semaphore symbol for "A" as it appears by a user with flags 18 is illustrated as the symbol corresponding to the letter "A". In FIG. 1G, the Morse code symbol for "A" as it appears on in dots and dashes 19 is illustrated as the symbol corresponding to the letter "A". In FIG. 1H, the International Maritime Signal Flag symbol 20 corresponding to the letter "A" is illustrated. While illustrated herein in black and white, certain symbolic notations use color as part of the notation. In these instances, the symbols on the tiles should preferably use correctly-colored symbols. For example, in the case of FIG. 1H, the dark portion of symbol 20 should be colored blue to reflect the correct color of the International Maritime Signal Flag for the letter "A."

For these alphabetic sets of symbols, the tile set will necessarily include all of the letters of the alphabet and can include additional copies of all the letters and/or additional copies of those commonly used for creating words. The letters used most frequently in the English language are E, T, A, O, I, N, S, and R, so inclusion of additional copies of such letters will be most likely to expand game play.

In one embodiment, a predetermined number of tiles is distributed to each player at the beginning of the game, with the symbolic notation side 13 exposed to the player. A first player creates a word by placement of tiles 10 into a holder 22, as illustrated in FIG. 2. While not necessarily to scale in FIG. 2, the holder is dimensioned to easily hold the maximum number of tiles allowed in a word by the rules of the game. The word spelled in this figure using semaphore notation is the word "CAB." The player announces the word that he/she has spelled and preferably writes the word down in order to avoid controversy. In the embodiment illustrated in FIG. 2, a small whiteboard 24 is provided for recording the word, although a separate board or writing pad could also be used. The player then turns the tiles over to check for correctness. If the player has correctly spelled the declared word, the player is given points based upon the number of letters in the word.

The tiles are then returned to display the symbolic notation side 13 in holder 22 and the holder is passed to the next player. The next player then makes a new word in the holder and can reuse or replace any of the existing tiles 10 in the holder 22. If the next player cannot create a new word or is incorrect in choosing tiles for the word he/she declares they are spelling, the player receives no points and play passes to back to the first player (in a two person game) or on to the next player in order (for games having more than two players). Alternately, if a player is incorrect in choosing tiles for the word he/she declares that they are spelling, points can be deducted for each letter in the word.

Depending on the number of original tiles, the number of players, and the predetermined number of tiles distributed to each player, there may be embodiments in which all of the tiles are not distributed. In such cases, the remaining, undistributed tiles can be removed from play in one embodiment. In other embodiments, undistributed tiles can be placed, symbolic notation side 13 up, in a pool that is available to all players. In such an embodiment, a player may be allowed to exchange one tile from those in play with one from the pool during each turn if the exchanged tile is used by the player to create a word during that turn. In a variation of this embodiment, the exchanged tile from the pool can be excluded from the letter count when determining the player's score for that turn.

Figure 3:
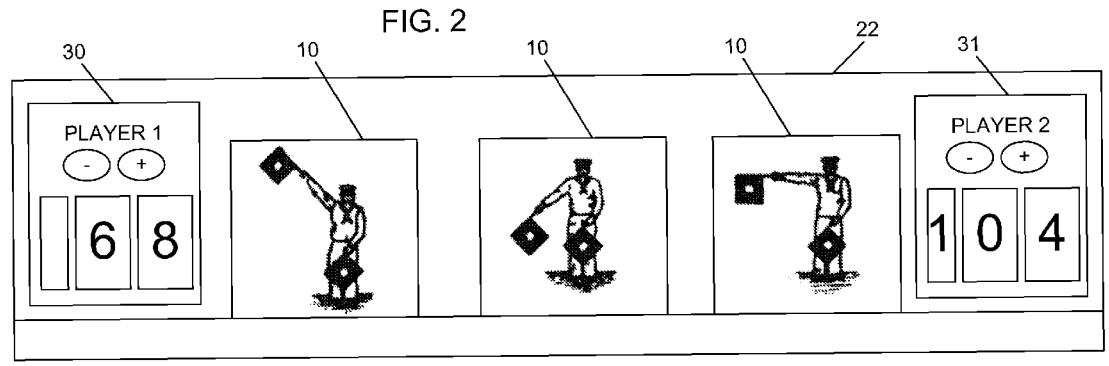
FIG. 3 illustrates an alternative tile holder that includes integral score displays.

In one embodiment, the game apparatus includes a means for displaying each player's point score. For a two-person game, the holder 22 can include user-controlled displays 30, 31 at each end of the holder 22, as illustrated in FIG. 3. Such displays 30, 31 can be mechanical, such as by using rotating wheels or flip-cards, or can be electronic, such as a switch-operated LED or LCD display. Other score display means can also be used, including, but not limited to, scoring sheets, white boards, and sliding counters (such as used for billiards and darts). While not necessarily to scale in FIG. 3, the holder 22 is dimensioned to easily hold the maximum number of tiles allowed in a word by the rules of the game. Further, in addition to playing individually, the game can be played as teams comprised of any number of players.

For computer-based embodiments using virtual tiles, the displayed "tiles" can have outlined shapes that can be manipulated by drop-and-drag techniques with a cursor and flipped by clicking on them in order to play in a manner corresponding to physical tiles. Alternately, the virtual tiles can merely consist of the respective symbols and letters themselves and be selected by suitable means such as cursor. Computer-based embodiments can further include play against a virtual computer-based player of varying skill levels, such as done with computer-based chess games and the like.

Computer-based embodiments are also well suited to alternate forms of play. In one such embodiment, a first player or team spells a word using letters and transmits the word over a network to a second player or team, wherein the word appears in symbolic form on the second player or teams computer display. The symbols must then be correctly deciphered in order to get points. In another alternate form of play, a transmitted or computer-generated "word" made up of symbols is "displayed" as it might be encountered in use. For musical notation, the note on a staff or on an instrument interface is accompanied by the corresponding sound (tone). For semaphore, a figure manipulating the flags in the proper sequence can be displayed. For International Maritime Signal Flag, a set of flags can be. For Morse code, a ticker tape and/or audible set of tones can be used to present the symbolic word.

Figure 4:
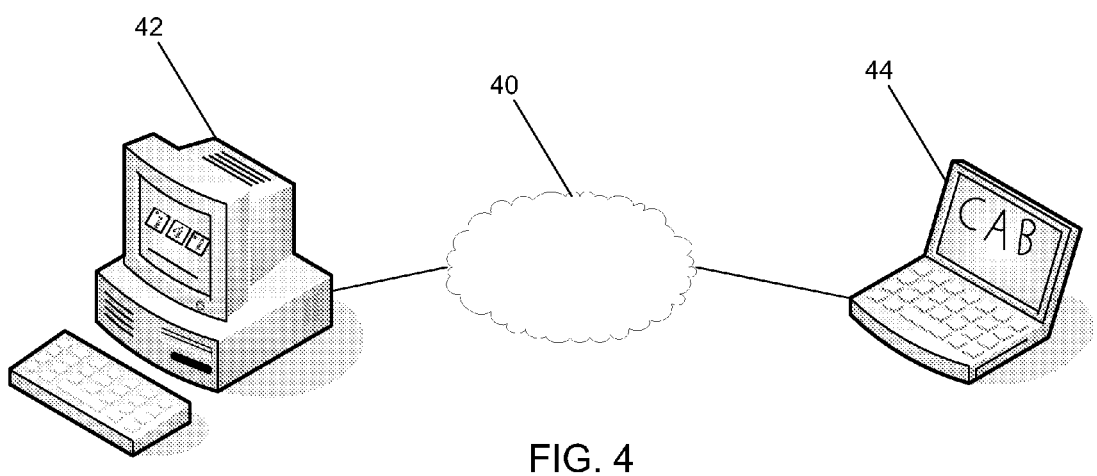
FIG. 4 illustrates networked computers for computer-based play of the tile game.

As illustrated in FIG. 4, a first player or team on a first computer 42 can play the tile game in a virtual manner with the tiles rendered on a display, either against a computer-based player operated by the software on computer 42 or against a second player or team using second computer 44 connected to the first computer 42 via a network 40, which may be a LAN (e.g., Ethernet hub/router) or WAN (e.g., Internet), whether wired or wireless. As used herein, a computer can be any device with a processor for executing instructions to display the tiles or other game elements on a display. Computers include, but are not limited to, desktop PCs, tablet PCs, laptop computers, palmtop computers, handheld gaming devices, mobile telephones, smart phones, and multimedia player devices.

Example 1

In an exemplary embodiment for teaching music notation to 2-3 players, the tile set includes three (3) of each tile for the letters associated with musical pitch, A, B, C, D, E, F, and G, for a total of 21 tiles. For two players, each player is given ten (10) tiles; for three players, each player is given seven (7) tiles.

During their turn, each player places tiles into the holder to spell a word, writes the word down to declare it, and then confirms correctness. Players can reuse letters on the holder, but only get points for the number of new letters used and can only use a maximum of seven (7) letters. If correct, points are awarded as follows:

5 points for each letter when 6-7 new letters are used;
  4 points for each letter when 4-5 new letters are used;
  3 points for each letter when 2-3 new letters are used; and
  2 points for each letter when 1 new letter is used.

If the word is incorrect, the player loses one (1) point for each letter in the word. Point totals are tallied and recorded for each turn, and the first player to reach one-hundred fifty (150) points wins the game.

Example 2

In an exemplary embodiment for teaching a symbolic alphabet (as found in Morse code, ASL, and semaphore) to 2-3 players, the tile set includes one (1) tile for each of the twenty-six (26) letters of the alphabet, and an additional tile for each of A, E, I, and T, for a total of thirty (30) tiles. For two players, each player is given fifteen (15) tiles; for three players, each player is given ten (10) tiles.

During their respective turns, each player places tiles into the holder to spell a word, writes the word down to declare it, and then confirms correctness of the spelled word. Players can reuse letters on the holder, but only get points for the number of new letters used and can only use a maximum of ten (10) letters. If correct, points are awarded as follows:

5 points for each letter when 6-10 new letters are used;
4 points for each letter when 4-5 new letters are used;
3 points for each letter when 2-3 new letters are used; and
2 points for each letter when 1 new letter is used.

Again, if the word is incorrect, the player loses one (1) point for each letter in the word. Point totals are tallied and recorded for each turn, and the first player to reach one-hundred fifty (150) points wins the game.

Example 3

In another exemplary embodiment for teaching a symbolic alphabet to 2-5 players, the tile set includes two (2) tiles for each of the twenty-six (26) letters of the alphabet, and an additional tile for each of A, E, I, O, N, R, S and T, for a total of sixty (60) tiles. For two players, each player is given fifteen (15) tiles; for three to five players, each player is given ten (10) tiles and undistributed tiles remain in the "pot" for use by the players.

During their respective turns, each player places tiles into the holder to spell a word, writes the word down to declare it, and then confirms correctness. Players can reuse letters on the holder and exchange and use a single letter from the pot, but only get points for the number of new letters used from their existing tiles and can only use a maximum of ten (10) letters. If correct, points are awarded as follows:

5 points for each letter when 6-10 new letters are used;
4 points for each letter when 4-5 new letters are used;
3 points for each letter when 2-3 new letters are used; and
2 points for each letter when 1 new letter is used.

Again, if the word is incorrect, the player loses one (1) point for each letter in the word. Point totals are tallied and recorded for each turn, and the first player to reach one-hundred fifty (150) points wins the game.

Example 4

In another exemplary embodiment for teaching a symbolic alphabet to 2 players or teams, the game is implemented virtually by use of computer-based software. The virtual tile set includes two (2) tiles for each of the twenty-six (26) letters of the alphabet, and an additional tile for each of A, E, I, O, N, R, S and T, for a total of sixty (60) tiles. Each player or team is given fifteen (15) tiles and undistributed tiles remain in the "pot" for use by the players.

During their respective turns, each player or team selects tiles displayed as alphabet letters to create a word using tiles they have been distributed. The player or team can "buy" letters in the pot for a predetermined number of points in order to create a word, but can only use a maximum of ten (10) letters. The player or team then transmits the word to the other player or team computer, where the word is displayed in symbolic form. The other player or team then deciphers the word by typing the appropriate letters and submitting their answer. If correct, points are awarded as follows:

5 points for each letter when 6-10 new letters are used;
4 points for each letter when 4-5 new letters are used;
3 points for each letter when 2-3 new letters are used; and
2 points for each letter when 1 new letter is used.

Again, if the word is incorrect, the other player or team loses one (1) point for each letter in the word. Point totals are tallied automatically via the game software and recorded for each turn, and the first player to reach one-hundred fifty (150) points wins the game.

It should be noted that the above examples and point scores are illustrative only. Other embodiments can have varying numbers of players and different distributions of tiles and/or points. Further, while the players in the examples play until a specific score is reached, in alternate embodiments the players could play for a set time or until all tiles are used.

While the tiles have been disclosed as square and the holder as having a straight horizontal shelf, the embodiments are not limited to these disclosed configurations. Tiles, without limitation, may be rectangular, triangular, pentagonal, hexagonal, octagonal, circular, oval, or any other suitable shape that is desired. Preferably, the tiles are uniform in shape and size, but this is not a requirement. Tiles may also vary in size so as to provide additional fine motor skill training where needed. Holders can be adapted to the particular shape or shapes used for the tiles. For example, with circular-shaped tiles, a holder may have a plurality of horizontally-adjacent arc-shaped supports. Further, holders are not limited to horizontal, shelf-like supports and may use magnetic or fastener-based devices for supporting the tiles.

One embodiment is to a tile game apparatus for learning alphabet-based symbolic notation. The apparatus comprises a tile set having at least one tile for each symbol of an alphabet-based symbolic notation, with each tile having a symbol on one side and a corresponding alphabetic character on the opposing side. It also includes a holder dimensioned to hold a predetermined number of tiles adjacent to one another; and means for recording a string of alphabetic characters that make up a word. In a variation of this embodiment, the means for recording the string of alphabetic characters produces a written word. In another variation, a means for recording game scores is included. The tile set for this embodiment can optionally comprise plural tiles for each symbol of the alphabet-based symbolic notation and/or comprise additional tiles of symbols corresponding to alphabetic characters E, T, A, O, I, N, S, and R.

In still other embodiments, the alphabet-based symbolic notation can be symbolic of musical tone or pitch based on letters A, B, C, D, E, F, and G, including where the alphabet-based symbolic notation is selected from the group consisting of notes on a musical scale, notes on an instrument interface, chords on a musical scale, and chords on an instrument interface.

In other embodiments, the alphabet-based symbolic notation can be a sign or code for each letter of the alphabet, including where the alphabet-based symbolic notation is selected from the group consisting of sign language, Morse code, and semaphore.

Another embodiment is tile game method for learning alphabet-based symbolic notation. This method comprises providing a tile set having at least one tile for each symbol of an alphabet-based symbolic notation, each tile comprising a symbol on one side and a corresponding alphabetic character on an opposing side. A predetermined number of tiles are distributed to each player or team with the symbols on the one side of the tiles visible. Each player or team takes ordered turns until a player or team reaches a predetermined score. Each turn comprises: the player or team creating a word with a predetermined number or fewer tiles that were distributed to the player or team by placing the tiles in order in a holder, the player or team recording the alphabetic string of the word, checking for correctness of the spelling of the word by viewing the alphabetic character on the opposing side of each of the tiles in the holder, and recording points for the player or team based upon the number of letters used in a correctly spelled word.

In a variation of this method, each turn further comprises passing the tile holder to the next player or team, wherein the next player or team creating a word with a predetermined number or fewer tiles can further use tiles in the holder from the previous turn, and the recording of points for the player or team is based upon the number of newly added letters used in a correctly spelled word. Options of this variation include those: wherein recording the alphabetic string of the word produces a written word; wherein providing the tile set comprises providing plural tiles for each symbol of the alphabet-based symbolic notation; wherein providing the tile set comprises providing additional tiles of symbols corresponding to alphabetic characters E, T, A, O, I, N, S, and R; wherein the alphabet-based symbolic notation is symbolic of musical tone or pitch based on letters A, B, C, D, E, F, and G, such as consisting of notes on a musical scale, notes on an instrument interface, chords on a musical scale, and chords on an instrument interface; and wherein the alphabet-based symbolic notation is a sign or code for each letter of the alphabet, such as consisting of sign language, Morse code, and semaphore.

A variation of the method can include one comprising deducting points from a player or team for each letter of an incorrect word. Another variation of the method comprises placing any undistributed tiles in a pot and allowing a player or team to exchange and use one letter from the pot during each turn.

A tile game apparatus and method for learning alphabet-based symbolic notation have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A tile game for learning alphabet-based symbolic notation, wherein the tile game is implemented on a computer comprising a processor programmed to:
    provide a virtual tile set having at least one tile for each symbol of an alphabet-based symbolic notation, each tile comprising a symbol from the alphabet-based symbolic notation on one virtual side and a corresponding alphabetic character on an opposing virtual side;
    distribute a predetermined number of tiles to each player or team user with the symbols on the one side of the tiles visible;
    allow each player or team user to take ordered turns until a player or team user reaches a predetermined score, wherein each turn comprises:
        accepting user input from a player or team user for creating a word with symbols using an ordered number of predetermined number or fewer tiles that were distributed to the player or team user;
        recording the ordered tiles of the word of the player or team user;
        checking for correctness of spelling of the word by checking the alphabetic character on the opposing side of each of the ordered tiles in the word; and
        scoring and recording points for the player or team user based upon the number of letters used in a correctly spelled word.

2. The tile game of claim 1, wherein the processor comprises programming such that each turn comprises:
    the player or team user creating a word on a first computer;
    a second player or team user viewing the word in symbolic form and attempting to decipher the word;
    checking for correctness of the spelling of the deciphered word; and
    recording points for the second player or team based upon the number of letters used in a correctly deciphered word.

3. The tile game of claim 1, wherein the processor comprises programming such that the word created on the first computer is transferred to a second computer over a network and the second player or team user views the word on the second computer.

4. The tile game of claim 2, wherein the processor comprises programming such that the alphabet-based symbolic notation is symbolic of musical tone or pitch based on letters A, B, C, D, E, F, and G and the alphabet-based symbolic notation is selected from the group consisting of notes on a musical scale, notes on an instrument interface, chords on a musical scale, and chords on an instrument interface.

5. The tile game of claim 2, wherein the processor comprises programming such that providing the virtual tile set comprises providing additional virtual tiles of symbols corresponding to alphabetic characters E, T, A, O, I, N, S, and R.

6. The tile game of claim 2, wherein the processor comprises programming such that the alphabet-based symbolic notation is a sign or code for each letter of the alphabet and the alphabet-based symbolic notation is selected from the group consisting of sign language, Morse code, semaphore, and International Maritime Signal Flags.

7. The tile game of claim 2, wherein the processor comprises programming such that each turn comprises:
    deducting points from a player or team user for each letter of an incorrect word.

8. The tile game of claim 2, further comprising:
    placing any undistributed tiles in a pot; and
    allowing a player or team to exchange and use one tile from the pot during each turn.

* * * * *